United States Patent
Willson et al.

(10) Patent No.: US 10,735,300 B1
(45) Date of Patent: Aug. 4, 2020

(54) DISCOVERY AND TESTING OF PROGRAM DEPENDENCIES IN COMPUTER NETWORKS

(71) Applicants: Michael Willson, Sunnyvale, CA (US); Jason T. Northcote, San Francisco, CA (US)

(72) Inventors: Michael Willson, Sunnyvale, CA (US); Jason T. Northcote, San Francisco, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 16/207,013

(22) Filed: Nov. 30, 2018

(51) Int. Cl.
H04L 12/26 (2006.01)
H04L 12/24 (2006.01)
H04L 29/08 (2006.01)

(52) U.S. Cl.
CPC .......... H04L 43/50 (2013.01); H04L 41/5058 (2013.01); H04L 43/16 (2013.01); H04L 67/32 (2013.01)

(58) Field of Classification Search
CPC ........ H04L 12/26; H04L 43/028; H04L 43/50
USPC ........................................ 370/241, 242, 250
See application file for complete search history.

(56) References Cited

U.S. PATENT DOCUMENTS

| | | | |
|---|---|---|---|
| 8,904,353 B1* | 12/2014 | Arguelles | G06F 11/3672 717/124 |
| 8,935,370 B2* | 1/2015 | Schoning | H04L 67/02 709/223 |
| 8,949,792 B2* | 2/2015 | Paterson | G06F 11/3664 714/38.1 |
| 9,230,056 B1* | 1/2016 | Stolberg | G01R 31/2825 |
| 9,384,074 B1* | 7/2016 | Peterson | G06F 11/36 |
| 9,710,368 B1* | 7/2017 | Gundeti | G06F 11/3692 |
| 9,898,393 B2* | 2/2018 | Moorthi | G06F 11/3688 |
| 10,289,535 B2* | 5/2019 | Yadav | G06F 11/3688 |
| 10,372,596 B2* | 8/2019 | Archer | G06F 11/3684 |
| 2012/0096183 A1* | 4/2012 | Mercuri | G06F 9/5027 709/241 |

OTHER PUBLICATIONS

Spragins, P., "Efficacy Presubmit", Google Testing Blog, Sep. 17, 2018, 8 pages.

* cited by examiner

Primary Examiner — Dmitry Levitan
(74) Attorney, Agent, or Firm — Ferguson Braswell Fraser Kubasta PC

(57) ABSTRACT

A method includes receiving, at a test identification service, a request to test a first service in an enterprise environment, identifying a service call of the first service, and identifying, using an endpoint of the service call, a second service called by the first service, the second service executing in the enterprise environment. The method further includes identifying a subset of tests from a test registry service including multiple tests, the subset of tests being configured to test the second service, and testing, using the subset of tests, the second service in the enterprise environment.

10 Claims, 10 Drawing Sheets

```
{
   "serviceName":
"First Service",
   "applicationId":
777,

"dependencyDepth"
: 1
}
```

*FIG. 4A*

Test Identification
Service Request

```
{
   "requestFilter": {
     "queryParams": {
        "applicationId": 777
     },
     "filters": []
   },
   "resultColumns": ["ID",
"NAME", "TYPE"],
   "offset": 0,
   "limit": 100,
   "searchFilters": [],
   "columnSorts": [],
   "timeRangeStart":
1539206951619,
   "timeRangeEnd":
1539293351619
}
```

Get Service Calls

*FIG. 4B*

```
{
   "data": [
     {
       "id": 888,
       "name" : "https://first-service.company.com:443",
        "exitPointSubtype": "HTTP",
       "performanceStats": null
     }, {
       "id": 999,
       "name" : "https://second-service.company.com:443",
        "exitPointSubtype": "HTTP",
       "performanceStats": null
     }, {
       "id": 000,
       "name" : "https://additional-service.company.com:443",
        "exitPointSubtype": "HTTP",
       "performanceStats": null
     }],
   "totalCount": 4
}
```

Response to "Get
Service Calls"

*FIG. 4C*

```
{
   "offset": 0,
   "limit": 20,
   "query":
"services"
}
```

Get
Services

*FIG. 4D*

```
[
  {
    "assetId": "123",
    "name": "Invoice service",
    "description": "Invoice a user...",
    "abbreviation": "inv",
    "createDate": "2014-05-05T10:27:15Z",
    "modifiedDate": "2018-10-11T10:21:35Z"
  },
  {
    "assetId": "456",
    "name": "Payroll service",
    "description": "Payroll service runs payroll for a company...",
    "abbreviation": "pay",
    "createDate": "2014-05-05T10:27:15Z",
    "modifiedDate": "2018-10-11T10:21:35Z"
  },
  {
    "assetId": "789",
    "name": "Tax Content Work Management Service",
    "description": "Tax Summary Definitions Service (TSDS) publishes tax summary definitions ...",
    "abbreviation": "tds",
    "createDate": "2014-05-05T10:27:15Z",
    "modifiedDate": "2018-10-11T10:21:35Z"
  }
]
```

Response to "Get Services"

*FIG. 4E*

Get Clients
```
{
  "assetId": "789",
  "offset": 0,
  "limit": 20
}
```

*FIG. 4F*

```
[
  {
    "client": {
      "assetId": "234",
      "name": "Authorization service",
      "shortName": "auth",
      "description": "Cross cutting authorization concerns...",
    },
    "endpointOnboardings": [
      {
        "endpoint": {
          "id": "ghi789",
          "environment": "qa",
          "approvalRequired": true,
          "internalUrl": "URL1.com",
          "externalUrl": "URL2.com",
          "status": "up",
          "modifiedDate": "1491454445000"
        }
      }
    ]
  }
]
```
} Response to "Get Clients"

*FIG. 4G*

Get Endpoints { `{ "assetId": "567" }` }

*FIG. 4H*

```
[
  {
    "id": "abc123",
    "environment": "prod",
    "internalUrl": "URL3.net",
    "externalUrl": "URL3.com",
    "status": "up",
    "modifiedDate": "1491454445000",
    "internalVHosts": ["URL3.net"],
    "externalVHosts": ["URL3.com"]
  },
  {
    "id": "def456",
    "environment": "perf",
    "internalUrl": "URL4.net",
    "externalUrl": "URL4.com",
    "status": "up",
    "modifiedDate": "1491454445000",
    "internalVHosts": ["URL4.net"],
    "externalVHosts": ["URL4.com"]
  },
  {
    "id": "ghi789",
    "environment": "qa",
    "internalUrl": "URL5.net",
    "externalUrl": "URL5.com",
    "status": "up",
    "modifiedDate": "1491454445000",
    "internalVHosts": ["URL5.net"],
    "externalVHosts": ["URL5.com"]
  }
]
```

Response to "Get Endpoints"

*FIG. 4I*

```
{
    "services": [
        "Invoice service",
        "Payroll service",
        "Tax Content Work
Management Service",
        "Authorization service"
    ]
}
```
— Get Tests

*FIG. 4J*

Response to "Get Tests":
```
{
    "tasks": [{
        "name": "Payroll_service_sanity_suite",
        "serviceName": "Payroll service",
        "image": "123.dkr.ecr.us-west-2.amazonaws.com/payroll/payrollSanity:v2"
    }, {
        "name": "Payroll_service_extended_suite",
        "serviceName": "Payroll service",
        "image": "123.dkr.ecr.us-west-2.amazonaws.com/payroll/payrollExtended:v1"
    }, {
        "name": "Invoice_payment_suite",
        "serviceName": "Invoice service",
        "image": "123.dkr.ecr.us-west-2.amazonaws.com/invoice/invPay:v12"
    }, {
        "name": "Tax_sanity",
        "serviceName": "Tax Content Work Management Service",
        "image": "123.dkr.ecr.us-west-2.amazonaws.com/tax/tax:v1"
    }, {
        "name": "Auth_sanity",
        "serviceName": "Authorization Service",
        "image": "123.dkr.ecr.us-west-2.amazonaws.com/payroll/auth/auth:v2"
    }]
}
```

*FIG. 4K*

```
{
   "tasks": [{
        "name": "Payroll_service_sanity_suite",
        "serviceName": "Payroll service",
        "image": "123.dkr.ecr.us-west-2.amazonaws.com/payroll/payrollSanity:v2"
    }, {
        "name": "Payroll_service_extended_suite",
        "serviceName": "Payroll service",
        "image": "123.dkr.ecr.us-west-2.amazonaws.com/payroll/payrollExtended:v1"
    }, {
        "name": "Invoice_payment_suite",
        "serviceName": "Invoice service",
        "image": "123.dkr.ecr.us-west-2.amazonaws.com/invoice/invPay:v12"
    }, {
        "name": "Tax_sanity",
        "serviceName": "Tax Content Work Management Service",
        "image": "123.dkr.ecr.us-west-2.amazonaws.com/tax/tax:v1"
    }, {
        "name": "Auth_sanity",
        "serviceName": "Authorization Service",
        "image": "123.dkr.ecr.us-west-2.amazonaws.com/payroll/auth/auth:v2"
    }]
}
```

} Test Identification Service Response

*FIG. 4L*

DISCOVERY AND TESTING OF PROGRAM DEPENDENCIES IN COMPUTER NETWORKS

BACKGROUND

An enterprise environment is a set of networked computers, together with software, that operate to accomplish a set of tasks which reflect the goals of the organization maintaining the enterprise environment. The networking infrastructure in a large enterprise environment involves many computer systems and can be extraordinarily complex.

SUMMARY

In general, in one aspect, one or more embodiments relate to a method that includes receiving, at a test identification service, a request to test a first service in an enterprise environment, identifying a service call of the first service, and identifying, using an endpoint of the service call, a second service called by the first service, the second service executing in the enterprise environment. The method further includes identifying a subset of tests from a test registry service including multiple tests, the subset of tests being configured to test the second service, and testing, using the subset of tests, the second service in the enterprise environment.

In general, in one aspect, one or more embodiments relate to a system that includes a data repository and a test identification service. The data repository stores a test registry that includes tests for testing services executable in an enterprise environment. The services including a first service executable in the enterprise environment and a second service executable in the enterprise environment. The test identification service is configured to receive, from a monitoring service, identification of a service call, the service call from the first service to a second service, send, to a query service, a request for a subset of tests, from the multiple tests, applicable to the second service, obtain, from the test registry, the subset of tests, and return the subset of tests.

In general, in one aspect, one or more embodiments relate to a non-transitory computer readable medium that includes computer readable program code, the computer readable program code for causing a computer system to receive, at a test identification service, a request to test a first service in an enterprise environment, identify a service call of the first service, and identify, using an endpoint of the service call, a second service called by the first service, the second service executing in the enterprise environment. The computer readable program code is further for identify a subset of tests from a test registry service that includes multiple tests, the subset of tests being configured to test the second service, and test, using the subset of tests, the second service in the enterprise environment.

Other aspects of the invention will be apparent from the following description and the appended claims.

BRIEF DESCRIPTION OF DRAWINGS

FIG. 4A, FIG. 4B, FIG. 4C, FIG. 4D, FIG. 4E, FIG. 4F, FIG. 4G, FIG. 4H, FIG. 4I, FIG. 4J, FIG. 4K, and FIG. 4L depict an example with respect to the use case in FIG. 3, in accordance with one or more embodiments.

DETAILED DESCRIPTION

Figure 1:
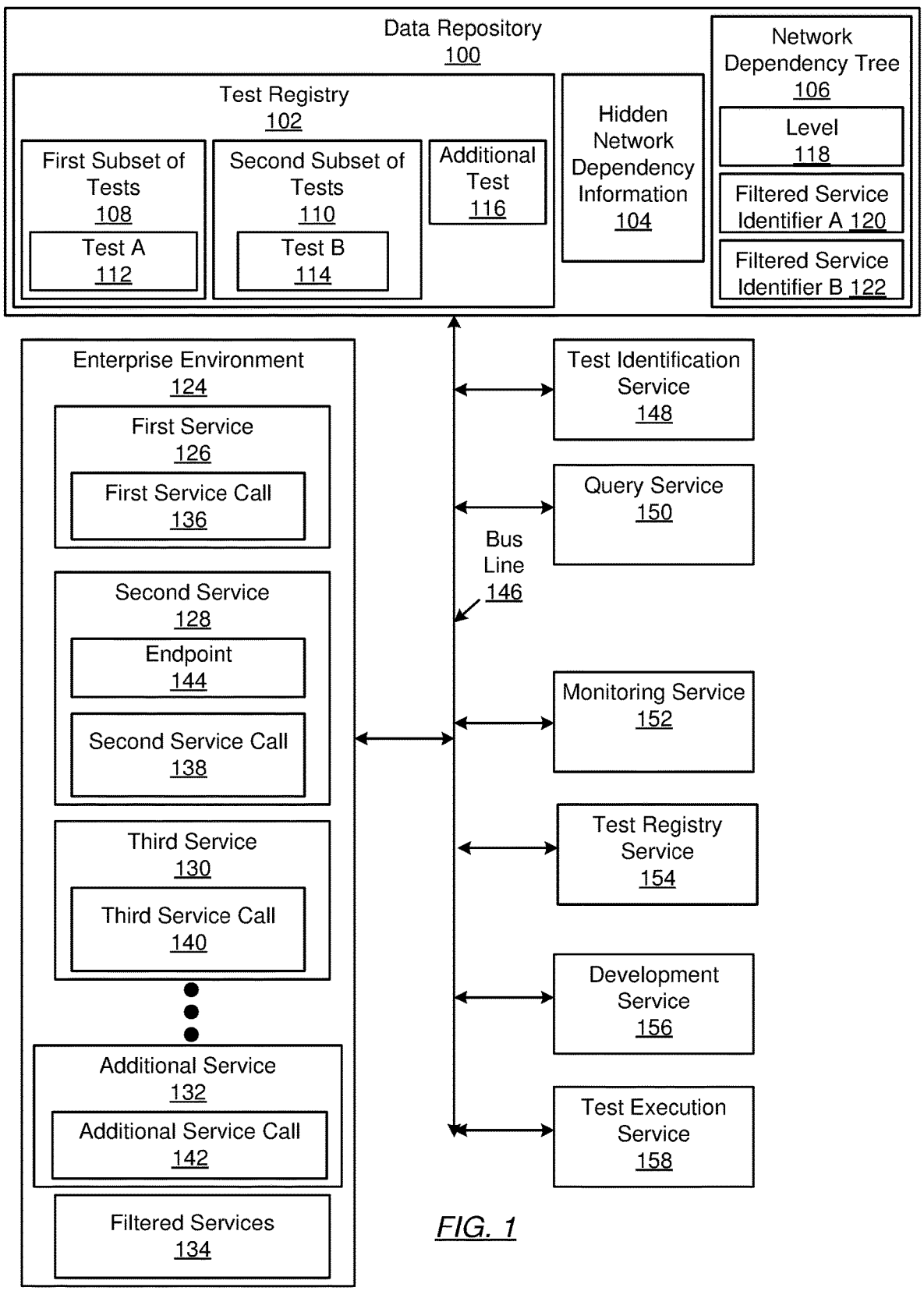
FIG. 1 depicts a schematic system diagram, in accordance with one or more embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to discovery and testing of services based on dependencies in computer networks. The embodiments include automated identification and implementation of tests for dependent services in an enterprise environment.

An example of an enterprise environment is the set of software and hardware which enable an online merchant or software provider to provide goods or services to users who visit the websites hosted by the provider. Such an enterprise environment may include many individual software programs called "services." Services commonly call on another service, sometimes many other services, as part of their programming.

In an enterprise environment including services, many of which call other services, a challenge exists in knowing which tests to run to validate that a selected service or a newly developed service is behaving as expected. The service that is to be tested may be referred-to as the "target service." Services that are called by the target service may be referred-to as "dependent services." As part of validating the health of the target service, tests should be run on the dependent services called by the target service in order to ensure that the dependent services are also operating as expected.

However, an issue arises in how to identify dependent services being called by the target service. A second issue arises in how to identify existing tests for the dependent services. The issue becomes more difficult when testing of one dependent service requires testing of other dependent services called by the service that directly depends from the target service. Discovery of a tree of such services may be difficult and identifying the tests desirable for testing the dependent services identified in the tree is more difficult yet. In some cases, a programmer may not have direct access to the dependent services, or to their corresponding tests, thereby creating a technical issue with respect to maintaining the enterprise environment.

The one or more embodiments are directed to technical, computer-implemented techniques for identifying hidden dependent services and also identifying the tests for the hidden dependent services. The computerized process of discovery of dependent services, and of tests for dependent services, can be performed according to the techniques described herein. Specifically, one or more embodiments described herein are configured to receive an identification of a target service. Based on the identification of the target service, monitoring during an execution of the target service is performed to identify calls to each dependent service, on which the target service is dependent. From the calls, the dependent services are identified, and, correspondingly, the tests for the dependent services are identified. The tests may span multiple endpoints for the dependent services. Accordingly, the dependent services may be tested along with testing the target service.

In one or more embodiments, the system that identifies which tests to run is called a test identification system (TIS). Once the TIS has returned metadata for the test suites to run, the metadata can be handed off to a continuous integration and continuous delivery (CI/CD) pipeline to execute the tests.

Attention is now turned to the figures. In particular, FIG. 1 depicts a schematic system diagram, in accordance with one or more embodiments. The system shown in FIG. 1 may be implemented by one or more computers in a possibly distributed computing environment. Thus, the system shown in FIG. 1 may be implemented by the computing system shown in FIG. 5A and FIG. 5B.

The system shown in FIG. 1 includes data repository (100). The data repository (100) is any type of storage unit and/or device (e.g., a file system, database, collection of tables, or any other storage mechanism) for storing data. Further, the data repository (100) may include multiple different storage units and/or devices. The multiple different storage units and/or devices may or may not be of the same type or located at the same physical site.

The data repository (100) includes several different features, including test registry (102), hidden dependency network information (104), and network dependency tree (106). Each is described in turn.

Test registry (102) is a registry, or list, of tests. Test registry (102) may include the tests themselves. For example, the test registry may store image files of the tests. The test registry (102) may store links to or references to tests. A test is software or application specific hardware configured to test a service. A service is a discrete software program, possibly implemented as application specific hardware, that performs a function in an enterprise environment.

Test registry (102) includes a first subset of tests (108) and a second subset of tests (110). The first subset of tests (108) includes one or more tests, such as test A (112), that are configured to test a service. The second subset of tests (110) includes one or more tests, such as test B (114), that are configured to test another service. The tests may be arranged as multiple subsets when grouped together for use in testing multiple dependent services, as described with respect to FIG. 2 and FIG. 3. In particular, each subset of tests could be directed to a different service. In other words, in the test registry, the subsets of one or more tests may be related to a particular service. However, tests do not necessarily have to be arranged in subsets. Thus, test registry (102) may include additional test (116).

As indicated above, data repository (100) also includes hidden network dependency information (104). Hidden network dependency information (104) is data which describes dependencies among services which are not immediately apparent when looking at a single service. A hidden network dependency exists when the target service includes a call to a dependent service, which in turn includes a call to subsequent dependent service(s). Thus, subsequent dependent services may also include subsequent calls. The hidden network dependency is between the dependent service and the one or more services directly or indirectly called by the dependent service.

The following is an example of a hidden network dependency. A first service is programmed to call a second service. The second service is programmed to call a third service in order to satisfy the call by the second service. The relationship between the first service and the third service may be characterized as a hidden network dependency. Continuing the example, assume the third service is programmed to call a fourth service in order to satisfy the call by the second service. In this case, a hidden network dependency also exists between the first service and the fourth service. Additionally, a hidden network dependency exists between the second service and the fourth service.

In another example, service A is the target service. Service A may call on service B to return a result back to service A. However, service B may call on service C in order to execute service B, which is not apparent when looking at service A. In the example, the relationship between service A and service C can be characterized as a "hidden network dependency." Information that describes a relationship between service A and service C may be termed "hidden network dependency information (104)." In an embodiment, the hidden network dependency information (104) may be the network dependency tree (106).

Network dependency tree (106) may be either a text file or an image file, or a combination thereof, which represents relationships among services. In the above example, the network dependency tree (106) could be represented as: service A calls on service B, and service B calls on service C. The term "tree" is used, as pictorially this arrangement could be represented by branching dependencies, with directly dependent services connected by lines or "branches" or "leaves".

Level (118), alternatively termed "level of dependency", is defined by the number of intervening services within the network dependency tree (106). In the above example, service A would be at a first level. Service B would be at a second level because Service B depends on service A directly. Service C would be a third level because Service B is an intervening service between service A and service C. In a real enterprise environment, many network dependency levels may be present for a service.

Network dependency tree (106) also includes a filtered service identifier A (120) and a filtered service identifier B (122). The filtered service identifier A (120) and the filtered service identifier B (122) are alphanumeric or pictorial information which identify filtered services. A filtered service is a service which remains in the network dependency tree (106) after filtering.

In an embodiment, all services within, or below, a level (118) may be filtered from the network dependency tree (106). The filtered services, described below with respect to filtered services (134), may be provided identifiers to indicate their status as filtered services (e.g., filtered service identifier A (120) and filtered service identifier B (122)). A threshold level of call dependency, which is a number or other representation, may be used to determine the level (118) of dependent services to be filtered.

The system shown in FIG. 1 also includes enterprise environment (124). The enterprise environment (124) includes one or more services, such as first service (126), second service (128), third service (130), and possibly many other services such as additional service (132). Again, a service is a discrete software program, possibly implemented as application specific hardware, that performs a function in an enterprise environment. The various services shown in the enterprise environment (124) are all example services used in the context of operational examples of the one or more embodiments described with respect to FIG. 2 and FIG. 3.

Each service may include a service call. In this example, a first service (126) includes a first service call (136); a second service (128) includes a second service call (138); a third service (130) includes a third service call (140), and an additional service (132) includes an additional service call (142). In embodiments, a service call (136, 138, 140, 142) is one or more lines of programming code within a service (126, 128, 130, 132) which, when executed, requests a called service to perform a function and possibly return a result. The service call (136, 138, 140, 142) may also include one or more lines of programming code which, when executed, allow the calling service (126, 128, 130, 132) to receive and process a return from the called service. The first service call (136) may be issued over a network, in which case the first service call (136) may be referred-to as a network call.

A service call may reference an endpoint. For example, the second service call (138) may include a reference to endpoint (144). An endpoint is the location in the dependent service being called by the service call, which in this example is in the second service (128). In other words, the endpoint (144) is the entry point to the service being called by the first service call (136). Although only one service and service call in FIG. 1 is shown as having an endpoint, all of the service calls shown in FIG. 1 have corresponding endpoints.

For the sake of simplicity of reference, the above description references "a service call" having "an endpoint". However, one or more embodiments contemplate that one or more services in the enterprise environment may have multiple service calls, with some or all of the multiple service calls having multiple endpoints. Thus, as used herein, reference to a singular "service", a singular "service call", and a singular "endpoint" all contemplate multiple services, service calls, and endpoints, accordingly.

As indicated above, the enterprise environment (124) may also include one or more filtered services (134). The filtered services (134) are those services which remain in the network dependency tree (106) after filtering. The filtered services (134) may also include service calls. If a filtered service includes a service call, then the service call of the filtered service will also reference a corresponding endpoint.

The system of FIG. 1 also includes other services which may operate within the enterprise environment (124), or which may operate outside of the enterprise environment (124). In the example of FIG. 1, the services used to identify and test services within the enterprise environment (124) are outside the enterprise environment (124), though nevertheless connect with the enterprise environment (124) via a network represented by a bus line (146), which is a bus that is configured to communicatively connect various network components. The network represented by the bus line (146) may be the network (520) shown in FIG. 5B.

Thus, the system of FIG. 1 includes a test identification service (148), a query service (150), a monitoring service (152), a test registry service (154), a development service (156), and a test execution service (158). Each of these services fits the definition of "service" given above; however, as described above each of these services may be separate from the enterprise environment (124).

The test identification service (148) is program code or application specific hardware which, when executed, is used to query, identify, filter, and return tests for identified services. In one or more embodiments, the test identification service (148) provides single contact point and corresponding infrastructure by which dependent services may be identified and corresponding tests obtained. In other words, through a single request to the test identification service, the tests may be obtained for dependent services, even when such dependent services are not known when the single request is issued. Test identification service may have an application programming interface and/or a user interface. For example, the application programming interface may be configured to communicate with an integrated development environment. The user interface includes functionality to receive requests from a user, such as a developer. Operation of the test identification service (148) is described further with respect to FIG. 2 and FIG. 3. In or more embodiments, the test identification service (148) is configured to directly interface with a query service (150), a monitoring service (152), and a test registry service (154). The query service (150), the monitoring service (152), and the test registry service (154) may be subroutines of the test identification service or separate services.

The query service (150) is program code or application specific hardware which, when executed, is used to query the test registry (102) for tests for services in the enterprise environment (124). The tests may include test A (112), test B (114), or additional test (116). Operation of the query service (150) is described further with respect to FIG. 2 and FIG. 3.

The monitoring service (152) is program code or application specific hardware which, when executed, is used to identify a service call, such as any of the first service call (136), the second service call (138), the third service call (140), or the additional service call (142) for the corresponding services in the enterprise environment (124). In other words, the monitoring service (152) is configured to identify dependent services. Examples of a monitoring service may be AppDynamics® monitoring tool or DynaTrace® monitoring tool. AppDynamics® is a registered trademark of AppDynamics, Inc., located in Delaware. DynaTrace® is a registered trademark of Dynatrace, LLC located in Massachusetts. As another example, the monitoring tool may be configured to issue a call to AppDynamics® monitoring tool or DynaTrace® monitoring tool to perform the monitoring. Operation of the monitoring service (152) is described further with respect to FIG. 2 and FIG. 3.

The test registry service (154) is program code or application specific hardware which, when executed, is used to organize and possibly store tests for services, such as the first service (126), the second service (128), the third service (130), the additional service (132), and the filtered services (134) in the enterprise environment (124). Operation of the test registry service (154) is described further with respect to FIG. 2 and FIG. 3.

The development service (156) is program code or application specific hardware which, when executed, is used to develop new services for use in the enterprise environment (124), or to modify existing services in the enterprise environment (124). For example, the development service may be an integrated development environment. Operation of the development service (156) is described further with respect to FIG. 2 and FIG. 3.

The test execution service (158) is program code or application specific hardware which, when executed, is used to execute a test once a test has been returned by the test identification service (148). Thus, the test execution service (158) may execute any of the first subset of tests (108), the second subset of tests (110), the test A (112), the test B (114), and the additional test (116). Operation of the test execution service (158) is described further with respect to FIG. 2 and FIG. 3.

While FIG. 1 shows a configuration of components, other configurations may be used without departing from the scope of the invention. For example, various components may be combined to create a single component. As another example, the functionality performed by a single component may be performed by two or more components.

Figure 2:
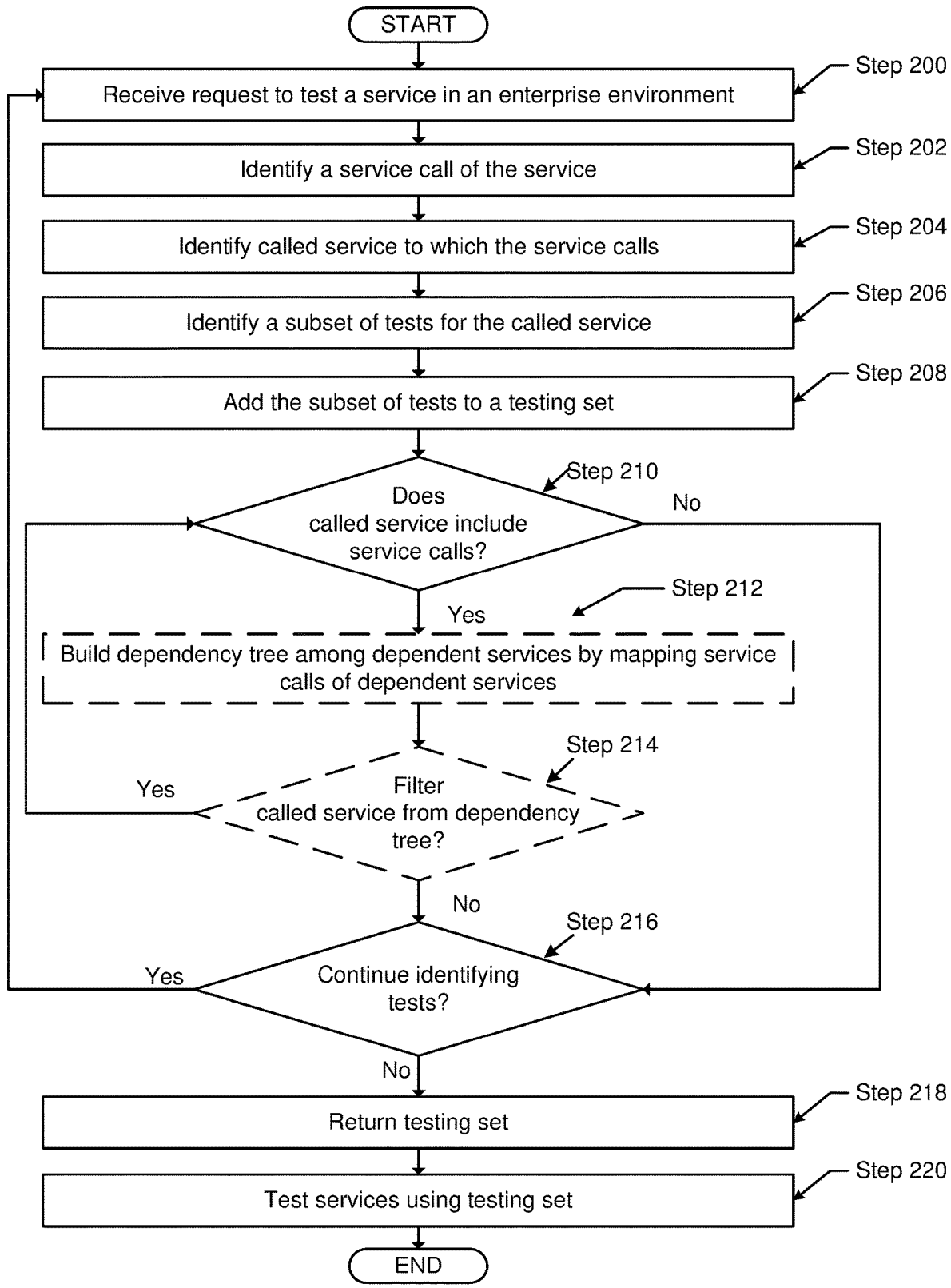
FIG. 2 depicts a flowchart diagram, in accordance with one or more embodiments.

Attention is now turned to FIG. 2, which depicts a flowchart diagram of operation of a test identification service, such as the test identification service (148) shown in FIG. 1. Thus, the method shown in FIG. 2 may be implemented using the system shown in FIG. 1. The method shown in FIG. 2 may also be implemented in the computing environment shown in FIG. 5A-5B.

In Step 200, a request is received to test a service in an enterprise environment. The request may be received in a test identification service, such as test identification service (148) of FIG. 1. The request may include an identifier of one or more target services. As described above, a service for which the test is received may be designated a "target service." A user may be developing a service for use in an enterprise environment, in which case the target service is the service under development. A user may also desire to test or otherwise verify operation of a target service that is already operating in the enterprise environment.

A service call of the service is identified (Step 202). For example, the target service may have a service call that calls some other service. The target service contains the service call, because ultimately, during normal operation, the target service expects some other service to return data. The technique of programming a service to call on other services is common in order to avoid having to re-write the code needed to perform the function of the called-upon service. The service call of the service may be identified by the test identification service issuing a call to the monitoring service. The monitoring service may implement tracing in the enterprise environment. Various different types of tracing may be implemented. For example, the network tracing may be performed by monitoring the network traffic through one or more network devices and network services (i.e., monitored device), such as the firewall, router, and other devices. Thus, the monitoring returns information about each service call through the network device. In the continuing example, the service call is to a second service. The second service is designed to take input from the target service, calculate a result, and return the result to the first service. A chain of such service calls may exist, whereby a service call to a second service triggers a service call from the second service to a third service, etc. By monitoring network traffic through one or more monitored devices, each service call may be obtained. Note, again, that reference to "a service call" contemplates one or more service calls in a single service.

Returning to FIG. 2, a called service to which the service calls is identified (Step 204). With each service call sent and received in the network through the one or more monitored devices, an identifier of the calling service and the called service may be obtained. The identifier may be the same or different as the identifier used by the test registry service for the called service. In one or more embodiments, for each service call, the test identification service sends a request to the query service with the service call, such as the identifier of the called service. By querying a repository with the called service identifier, the query service sends information about the called service of the service call to the test identification service. The information may include endpoints, clients, and other information.

For the example where the target service is under development, the programmer would like to know whether the second service is working properly so that the entire end-to-end result produced by the first service is what the programmer expects. In other words, the programmer would like to test the second service, not the target service. An assumption is made in this example that the target service is being tested in some other manner.

For a large enterprise environment, many tests may be available for a variety of services in the enterprise. Additionally, many tests may exist for a single service. However, identifying which tests are of interest to the programmer may be difficult, for the reasons given above.

A subset of tests is identified for the called service (Step 206). In one or more embodiments, the test identification service sends a request to the test registry service with the information provided by the query service. The test registry service performs a lookup in the test registry and identifies the test images matching the information. The subset of tests may be identified by scanning a list of available tests for the second service. The subset of tests could be all of the available tests or could be less than all of the available tests. In the latter case, which tests are selected may be determined by metadata or some other rules or policies provided to the test identification service.

The subset of tests is added to a testing set (Step 208). The testing set is the set of tests that will be applied to the called service (the second service in the ongoing example). Adding the subset of tests to a testing set may be to add a list of tests to a file which stores a list of the subset of tests.

A determination is made whether the called service includes service calls. In other words, a determination is made whether the second service itself includes service calls (Step 210). The procedure for determining whether the second service includes service calls may follow the same type of procedure described with respect to step 202, where a service call of the target service is identified.

In the continuing example, the programmer desires to ensure that the target service being developed functions properly from end-to-end. Thus, the programmer may desire to find and test all services that may call on each other as part of a chain of service operations initiated by the target service calling the second service.

If the called service does not include service calls (a "no" determination at Step 210), then the method of FIG. 2 skips to Step 216 to determine whether to continue identifying tests, as described further below.

In an optional Step, a dependency tree among dependent services is built by mapping service calls of dependent services (Step 212). In other words, be a large set of services may exist, each of which calls on some other service as part of its normal operation. A dependency tree may be formed which shows the dependency relationships among the large set of services. The dependency tree may be formed by creating a text file which describes the dependency relationships among services, by creating a pictograph of the dependency relationships among services, or any other suitable data structure capable of containing data that specifies the dependency relationships among services.

As a specific example, assume Service A calls on Service B to produce and return a result. Service B calls on both Service C and Service D in order to produce and return the result. Service D calls on Service E in order to produce and return another result needed by Service D to return data to Service B. The dependency tree built in this example would be A-B-(C and D(-E)). This dependency could also be represented pictorially as a "tree" with the trunk being Service A, a line between Service A and Service B, two lines (one each) between Service B and Service C and Service D, and another line between Service D and Service E.

In some embodiments, a programmer may not desire to test all possible services which might be called as a result of the target service calling another service. Thus, a determination is made whether to filter a called service from the dependency tree (Step 214). The determination of whether to filter a called service may be specified as metadata in the initial request to test a target service at step 200. A more specific example of how to designate service filtering is shown in FIG. 4A, where the "dependency depth" in the test identification service request indicates which services are to be used. The term "dependency depth" is defined further below with respect to FIG. 4A. Note, however, that specific services may be individually filtered, if desirable, by identifying them specifically (again, such as in the test identification service request). Thus, filtering the dependency tree may be selecting one or more services and removing them from the dependency tree. For example, Service C in the above example might be removed from the dependency tree; i.e., filtered.

However, the dependency tree may also be filtered according to some rule or policy. For example, all dependent services below a predetermined level in the dependency tree may be removed from the dependency tree or ignored when processing the dependency tree. Continuing the above example, all third tier services and below might be ignored, meaning that Service D would be excluded. Service D is in a third tier in the dependency relationship that starts with Service A.

Any tier may be selected for filtering. Selection of the tier itself may be performed automatically according to some rule or policy or may be selected by a user.

If a called service is to be filtered, (a "yes" determination at Step 214), the method of FIG. 2 returns to Step 210 to continue to determine whether a called service includes more service calls. If not (a "no determination at Step 214), yet another determination is made at Step 216 to determine whether to continue identifying tests, as described further below.

Once filtering is complete or undesirable (a "no" determination at step 214) or if a service does not include service calls (a "no" determination at step 210), then determination is made whether to continue identifying tests (Step 216). If so, (a "yes" determination at Step 216), the method of FIG. 2 returns to Step 200, and the process of FIG. 2 repeats. If not, (a "no determination at Step 216), the method of FIG. 2 continues to Step 218, as described further below.

The decisions at Step 210, Step 214, and Step 216 create a loop, in which dependent services are identified via service calls in each service. Thereafter, tests that will be applied to selected ones of the dependent services are identified. As a result of this loop, the one or more embodiments are capable of identifying hidden network dependencies among services.

Hidden network dependencies are, by definition, difficult to identify. Hidden network dependencies may be especially challenging in a large enterprise environment where there are hundreds, or even many thousands, of services operating in the environment. Identifying the tests for all dependent services is even more challenging in a large enterprise environment.

Nevertheless, the result of Step 200 through 216 is a testing set. Accordingly, at Step 218, the test identification service may return the testing set. The testing set may be returned to a continuous integration/continuous delivery pipeline, such as shown at number "12" in FIG. 3, via a return to the request to the test identification service.

The services to be tested are tested using the testing set (Step 220). The continuous integration/continuous delivery pipeline may be used to perform the tests on the services in the testing set, possibly in the enterprise environment. However, some other testing service may be used to test the services in the testing set.

The steps described with respect to FIG. 2 may be varied. The method of FIG. 2 may include more, fewer, or different operations.

For example, the one or more embodiments contemplate using a development service to build the target service prior to Step 200. In another example, both services and tests may be added to the enterprise environment. In this case, the method may be adjusted, possibly continuously during the loop of Step 200 through Step 216, to account for the addition of other service, or for the addition of other tests that may be available for use in the testing set. Still other variations are contemplated.

Thus, while the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

Figure 3:
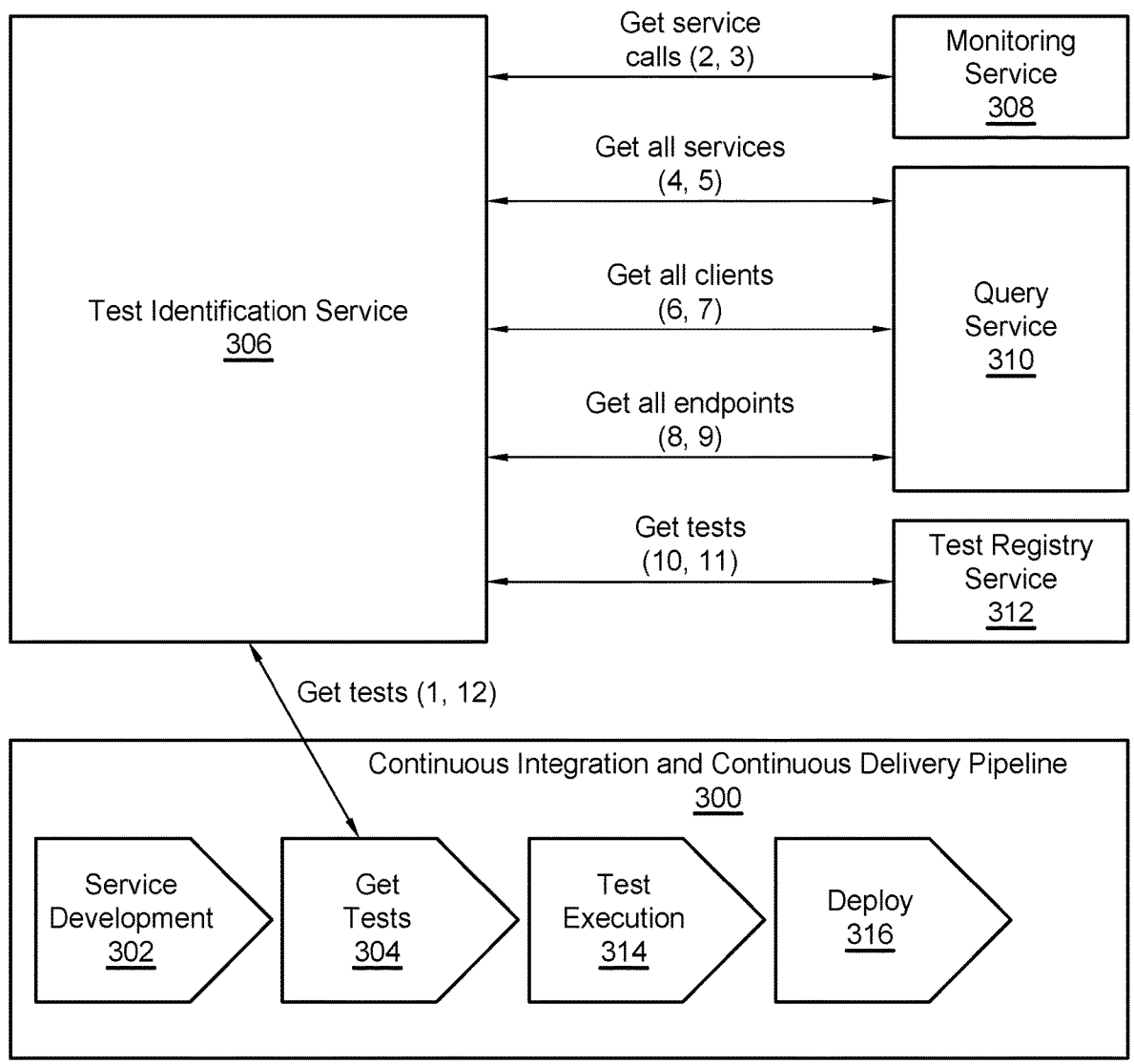
FIG. 3 depicts an example schematic diagram of a use case, in accordance with one or more embodiments.

The following example is for explanatory purposes only and not intended to limit the scope of the claimed inventions or other embodiments described herein. FIG. 3 and FIG. 4A through FIG. 4L represent a specific, use-case example to illustrate the one or more embodiments. FIG. 3 represents an overall architecture. FIG. 4A through 4L represent exemplary JAVASCRIPT® OBJECT NOTATION (JSON) calls for implementing various instructions and should be read in the context of FIG. 3.

In this example, continuous integration and continuous delivery pipeline and service (300), also known as CI/CD pipeline (300), is being used to develop and test services in an enterprise environment. Initially, a programmer performs service development (302). In this example, Service A is being developed.

In this example, Service A provides functionality in an enterprise environment to cause a display of a widget on a remote user's screen. The user can interact with the widget to purchase financial software. Service A contains software functionality to receive the user's input and transmit the appropriate messages to other services in the enterprise environment, accordingly.

The other services may perform a variety of actions. For example, another service may coordinate the financial transaction between the user's bank account and the software provider's bank account. Another service, yet, may grant permissions to the user to allow the user to access the financial software, or perhaps may handle electronic delivery of the financial software to the remote user's computer. Still another service may look for other financial software products that could be of interest to the remote user and transmit an advertising message to the user for purchase of those other financial software products.

After service development, the CI/CD pipeline (300) gives an order to get tests (304). At this point, a request for tests is transmitted to test identification service (306).

The double arrow between the order to "get tests" (304) in the CI/CD pipeline (300) and the test identification service (306) indicates two numbers, "1", and "12". The number "1" refers to the first step in the test identification and retrieval process, which is a test identification service request. The number "12" refers to the last step in the test identification and retrieval process, which is to return a test identification service response.

FIG. 4A shows an example of the JSON that is transmitted as the test identification service request to the test identification service (306) (number "1" on FIG. 3). The service name of the target service is identified, in this case "Service A" together with an application identification and a dependency depth. The dependency depth is an example of a threshold level of call dependency. In this case, the dependency depth is "1", thereby indicating that only services that directly depend from Service A should be tested. However, any dependency depth may be indicated. For example, the dependency depth could be "−1", which indicates all dependent services, or a complete depth of dependent services, should be tested.

Returning to FIG. 3, next the test identification service (306) transmits a request to "get service calls" from a monitoring service (308). The monitoring service (308) then examines Service A for service calls to other services. The monitoring service returns found service calls to the test identification service (306).

FIG. 4B and FIG. 4C show examples of the JSON that is transmitted in order to get the service calls (number "2" on FIG. 3) and returning the service calls (number "3" on FIG. 3), respectively. The endpoints of service calls in Service A are searched and a return of three dependent services are identified. In other words, Service A directly calls on three other services, and may use returned data from those three other services in order to function properly.

Returning to FIG. 3, once the test identification service (306) receives the returned service calls, the test identification service (306) sends a request to "get all services" from a query service (310). Specifically, the test identification service (306) is transmitting a request to the query service to retrieve a list of the services corresponding to the service calls already returned.

FIG. 4D and FIG. 4E show examples of the JSON that is transmitted in order to get the services (number "4" on FIG. 3) and returning the list of service (number "5" on FIG. 3). In this example, what are returned are three services: an "invoice service," a "payroll service", and a "tax content work management service." Also returned are the names of the services are identification numbers, and metadata of interest, such as creation and modification dates.

Returning to FIG. 3, the test identification service (306) also requests a list of clients from the query service (310). The list of clients is then returned.

FIG. 4F and FIG. 4G show examples of the JSON that is transmitted in order to get the clients (number "6" on FIG. 3) and returning the clients (number "7" on FIG. 3). As can be seen in FIG. 4G, a list of clients having the corresponding asset identifications is returned.

Returning to FIG. 3, the test identification service (306) also requests all endpoints from the query service (310). The endpoints are then returned.

FIG. 4H and FIG. 4I show examples of the JSON that is transmitted in order to get the endpoints (number "8" on FIG. 3) and returning the endpoints (number "9" on FIG. 3). As can be seen in FIG. 4I, a list of endpoints for the service calls of the dependent services are returned.

Returning to FIG. 3, the test identification service (306) also requests tests from a test registry service (312) that are applicable to the returned service, clients, and endpoints. The tests are returned to the test identification service (306).

FIG. 4J and FIG. 4K show examples of the JSON that is transmitted in order to get the tests (number "10" on FIG. 3) and returning the tests (number "11" on FIG. 3.). As can be seen in FIG. 4J the services are identified. As can be seen in FIG. 4K, a list of tests is returned to the test identification service (306). For example, a "payroll service sanity suite" is the name of one or more tests applicable to the payroll service that is dependent on Service A. This, and the other tests shown in FIG. 4K, are returned to the test identification service (306). In the example, the returned tests is a location of the one or more image files having the tests.

Returning to FIG. 3, the test identification service (306) returns the returned tests to the CI/CD pipeline (300). FIG. 4L shows an example of the JSON that is transmitted in order to return the tests to the CI/CD pipeline (300) (number "12" on FIG. 3). In this example, FIG. 4L matches FIG. 4K. However, the JSON that is transmitted in order to return the tests from the test registry service (312) to the test identification service (306) does not necessarily have to match the JSON that is transmitted in order to return the tests from the test identification service (306) to the CI/CD pipeline (300). For example, more or less metadata may be returned from the test identification service (306) to the CI/CD pipeline (300), depending on limitations defined in the JSON described in the "get tests" command from the CI/CD pipeline (300) to the test identification service (306) (see FIG. 4A).

Regardless of which tests and what metadata is returned to the CI/CD pipeline (300), the CI/CD pipeline (300) performs test execution at (314). Assuming the dependent services behave as they should, the target service (Service A in this case) may be deployed by the CI/CD pipeline (300) at the deploy stage (316). Once deployed, the new service becomes part of the enterprise environment.

Figure 5A:
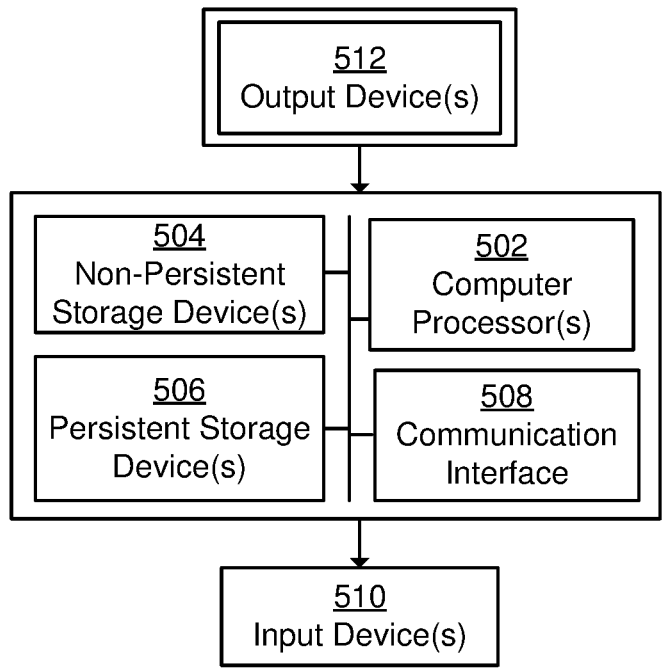
FIGS. 5A and 5B depicts a computer system and network in accordance with one or more embodiments

Embodiments of the invention may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 5B:
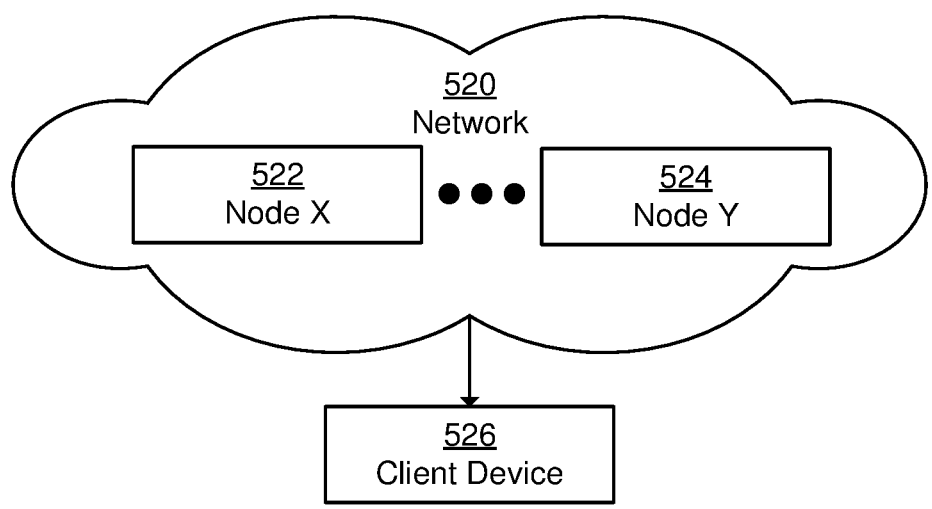

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments of the invention.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 5A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 5A, while performing one or more embodiments of the invention, may perform data comparison. Data comparison may be used to compare two or more data values (e.g., A, B). For example, one or more embodiments may determine whether $A>B$, $A=B$, $A\,!=B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if $A>B$, B may be subtracted from A (i.e., $A-B$), and the status flags may be read to determine if the result is positive (i.e., if $A>B$, then $A-B>0$). In one or more embodiments, B may be considered a threshold, and A is deemed to satisfy the threshold if $A=B$ or if $A>B$, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 5A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 5A and the nodes and/or client device in FIG. 5B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
   receiving, at a test identification service, a request to test a first service in an enterprise environment;
   identifying a service call of the first service;
   identifying, using an endpoint of the service call, a second service called by the first service, wherein
      the second service executing in the enterprise environment, and
      the second service is dependent on the first service;
   identifying a first subset of tests from a test registry service comprising a plurality of tests, the subset of tests being configured to test the second service;
   testing, using the first subset of tests, the second service in the enterprise environment;
   building a network dependency tree among a plurality of dependent services in the enterprise environment, the plurality of dependent services in a call dependency relationship with the second service;
   filtering the network dependency tree for at least one filtered service identifier corresponding to at least one additional filtered service;
   identifying a second subset of tests from the test registry service, the second subset of tests being configured to test the at least one additional filtered service; and
   testing, using the second subset of tests, the at least one additional filtered service in the enterprise environment.

2. The method of claim 1, further comprising:
   building, in a development service prior to receiving the request, the first service.

3. The method of claim 1, further comprising:
   further filtering the dependency tree by limiting a level of dependency of services in the network dependency tree to below a threshold level of call dependency.

4. The method of claim 1, further comprising:
   adding an additional service to the plurality of services; and
   adding, to the plurality of tests, an additional test for the additional service.

5. A system comprising:
   a data repository storing a test registry comprising a plurality of tests for testing a plurality of services executable in an enterprise environment, and a network dependency tree comprising a plurality of nodes, wherein:
      the plurality of services including a first service executable in the enterprise environment and a second service executable in the enterprise environment,
      the second service is dependent on the first service,
      when a call relationship exists between two services of the plurality of services, a link exists in the network dependency tree between two corresponding nodes of the plurality of nodes, and
      wherein each node of the plurality of nodes corresponds to a corresponding service in the plurality of services; and
   a test identification service in communication with the data repository and configured to:
      receive, from a monitoring service, identification of a service call, the service call from the first service to a second service,
      send, to a query service, a request for a first subset of tests, from the plurality of tests, applicable to the second service,
      obtain, from the test registry, the first subset of tests,
      return the first subset of tests;
      identify a second service call by the second service to a third service executing in the enterprise environment, and
      identify a second subset of tests, from the plurality of tests, applicable to the third service; and
   a text execution service in communication with the data repository and configured to execute the first subset of tests and the second subset of tests.

6. The system of claim 5, further comprising:
   a development service configured to develop an additional test for the plurality of services, wherein the development service is further configured to add the additional test to the plurality of tests in the test registry service.

7. The system of claim 5, wherein the first service and the third service interact only indirectly.

8. A non-transitory computer readable medium comprising computer readable program code, the computer readable program code for causing a computer system to:

receive, at a test identification service, a request to test a first service in an enterprise environment;

identify a service call of the first service;

identify, using an endpoint of the service call, a second service called by the first service, wherein:
    the second service executing in the enterprise environment, and
    the second service is dependent on the first service;

identify a subset of tests from a test registry service comprising a plurality of tests, the subset of tests being configured to test the second service;

test, using the subset of tests, the second service in the enterprise environment;

build a network dependency tree among a plurality of dependent services in the enterprise environment, the plurality of dependent services in a call dependency relationship with the second service;

filter the network dependency tree for at least one filtered service identifier corresponding to at least one additional filtered service;

identify a second subset of tests from the test registry service, the second subset of tests being configured to test the at least one additional filtered service; and test, using the second subset of tests, the at least one additional filtered service in the enterprise environment.

9. The non-transitory computer readable medium of claim 8, wherein the computer readable program code further causes the computer system to:

build, in a development service prior to receiving the request, the first service.

10. The non-transitory computer readable storage medium of claim 8, wherein the computer readable program code further causes the computer system to:

further filter the dependency tree by limiting a level of dependency of services in the network dependency tree to below a threshold level of call dependency.

* * * * *

UNITED STATES PATENT AND TRADEMARK OFFICE
CERTIFICATE OF CORRECTION

PATENT NO. : 10,735,300 B1
APPLICATION NO. : 16/207013
DATED : August 4, 2020
INVENTOR(S) : Michael Willson et al.

It is certified that error appears in the above-identified patent and that said Letters Patent is hereby corrected as shown below:

In the Claims

Claim 5, Column 18, Line 54, the word "text" should read -- test --.

Signed and Sealed this
Twenty-seventh Day of October, 2020

Andrei Iancu
*Director of the United States Patent and Trademark Office*